United States Patent
Sargent et al.

(10) Patent No.: US 10,025,574 B1
(45) Date of Patent: Jul. 17, 2018

(54) PACKAGED INSTALLATION FILE BASED ON AUTOMATIC DETECTION OF DEVICE CAPABILITIES

(71) Applicant: GOOGLE INC., Mountain View, CA (US)

(72) Inventors: Antony John Sargent, Mountain View, CA (US); Erik Kay, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/019,504

(22) Filed: Sep. 5, 2013

(51) Int. Cl.
*G06F 8/41* (2018.01)
*G06F 8/61* (2018.01)

(52) U.S. Cl.
CPC ............... *G06F 8/61* (2013.01); *G06F 8/447* (2013.01)

(58) Field of Classification Search
CPC ...... G06F 17/30905; G06F 21/84; G06F 8/60; G06F 8/61; G06F 17/2264; G06F 3/1286; G06F 3/1287; G06F 2221/0704; G06F 8/71; G06F 9/44542; H04L 67/02; H04L 67/04; H04L 67/2823; H04N 1/00503; H04N 21/25825; H04N 21/4516
See application file for complete search history.

(56) References Cited

U.S. PATENT DOCUMENTS

| | | | | |
|---|---|---|---|---|
| 7,669,201 B2* | 2/2010 | Seely | .................. | G06F 8/61 717/146 |
| 7,912,935 B2* | 3/2011 | Merissert-Coffinieres | ................ | G06F 8/00 709/218 |
| 8,171,470 B2* | 5/2012 | Goldman | .................. | G06F 8/61 717/120 |
| 8,667,483 B2* | 3/2014 | Coussemaeker et al. | .... | 717/174 |
| 2005/0108678 A1* | 5/2005 | Goodwin | .................. | G06F 8/20 717/100 |
| 2006/0248524 A1* | 11/2006 | Seely | ........................ | G06F 8/64 717/174 |

(Continued)

OTHER PUBLICATIONS

Colombo-Mendoza et al. "A novel approach for generating multi-device Rich Internet Applications." Electrical Communications and Computers (CONIELECOMP), 2012 22nd International Conference on. IEEE, 2012. Retrieved on [Feb. 28, 2018] Retrieved from the Internet:URL<http://ieeexplore.ieee.org/abstract/document/6189939/>.*

(Continued)

*Primary Examiner* — Thuy Dao
*Assistant Examiner* — Cheneca Smith
(74) *Attorney, Agent, or Firm* — Brake Hughes Bellerman LLP

(57) ABSTRACT

A digital marketplace stores an installable web application including a first packaged file including a manifest file and a web page. The digital marketplace receives a request for installation of the installable web application from a computing device. The digital marketplaces automatically determines a computing platform type of the computing device, based on the request, and automatically creates a version of an installation file for the installable web application based on the computing platform type. The version of the installation file includes a portion of the first packaged file. The version of the installation file is smaller than the first packaged file. The digital marketplace provides the version of the installation file to computing device.

17 Claims, 5 Drawing Sheets

(56) References Cited

U.S. PATENT DOCUMENTS

| | | | | |
|---|---|---|---|---|
| 2007/0174824 | A1* | 7/2007 | Relyea | G06F 8/61 |
| | | | | 717/140 |
| 2008/0127170 | A1* | 5/2008 | Goldman | G06F 8/61 |
| | | | | 717/174 |
| 2009/0013310 | A1* | 1/2009 | Arner | H04L 67/02 |
| | | | | 717/120 |
| 2010/0251231 | A1* | 9/2010 | Coussemaeker et al. | 717/176 |
| 2012/0311675 | A1* | 12/2012 | Ham | G06F 8/61 |
| | | | | 726/4 |
| 2012/0317561 | A1* | 12/2012 | Aslam et al. | 717/168 |
| 2013/0145348 | A1* | 6/2013 | Agovic | G06F 17/3056 |
| | | | | 717/120 |

OTHER PUBLICATIONS

Heitkötter, Henning, et al. "Evaluating Frameworks for Creating Mobile Web Apps." WEBIST. 2013.Retrieved on [Feb. 28, 2018] Retrieved from the Internet:URL<https://www.wi.uni-muenster.de/sites/wi/files/public/department/pi/publications/heitkoetter/evaluating-frameworks-for-creating-mobile-web-apps.pdf>.*

"Application Manifests", (msdn.microsoft.com/en-us/library/windows/desktop/aa374191(v=vs.85).aspx), printed Jun. 24, 2013; 5 pages.

"Gecko user agent string reference", MDN, (https://developer.mozilla.org/en-US/docs/Gecko_user_agent_string_reference), printed Jul. 8, 2013, 5 pages.

"Operating System Detection by Java or JavaScript", Stack Overflow, (stackoverflow.com/questions/4155032/operating-system-detection-by-java-or-javascript/4155078#4155078), printed Jul. 8, 2013, 2 pages.

* cited by examiner

```
{
    "name": "Carz",
    "description": "Enter a fast racing game",
    "version": "1",
    "requirements":
    {
        "Mac," "Windows," "Linux," "3D":
    }
}
```

FIG. 2

PACKAGED INSTALLATION FILE BASED ON AUTOMATIC DETECTION OF DEVICE CAPABILITIES

TECHNICAL FIELD

This disclosure generally relates to web applications, and more particularly, to installation of packaged web applications based on automatic detection of device capabilities and features.

BACKGROUND

Typically, a person may access a web store or digital marketplace using a specific kind of operating system or web browser. Yet, a person may want to access a web store or digital marketplace using any kind of operating system or web browser, and people want the ability to download applications from a digital marketplace regardless of the type of operating system or browser.

A manifest or header file for an installable web application may have various data, such as declarations for permissions for APIs used by the web application. An author of a web application may wish to customize the web application based on different features of different devices that may utilize the web application, and yet, the developer may still wish to upload only a single packaged file to the web store or digital marketplace.

It may prove advantageous for developers if they are not required to develop many different packaged files for different versions of applications to have the application run on types of devices with different features. Examples of different features include different operating system platforms, types of graphics processors, or devices with or without touch screens, or different modes. Therefore, a need exists for systems and methods to address the shortfalls of present technology and to provide other new and innovative features.

SUMMARY

A method and system allow an author of a web application to customize the web application based on capabilities of different devices that may utilize the web application, and yet allow the author to upload a single packaged file to a web store. When a user requests or actually installs the web application from a web store, the web store may identify capabilities of the user's device and, based on the identified capabilities, may leave out any bits not needed to successfully execute the web application on the user's device. A few examples of the bits that may be left out include: binary machine code compiled for other CPU architectures, and resources such as, for example, images or CSS stylesheets used in different operating systems or different screen pixel densities, from the current device. Thus, the user only has to download the appropriate files, for example based on the type of operating system of the device. In this way, the user may download a smaller installation file, which saves space and time. For example, a user may only need to download a 20 MB file instead of a 60 MB file. Developers may still deliver one package to the web store, whereas from a user perspective, different client devices get different packages, which may be smaller, and which may be based on features of the client device, for example the type of operating system of the particular client device requesting the application.

In one implementation, a digital marketplace stores an installable web application including a first packaged file including a manifest file and a web page. The digital marketplace receives a request for installation of the installable web application from a computing device. The digital marketplaces automatically determines a computing platform type of the computing device, based on the request, and automatically creates a version of an installation file for the installable web application based on the computing platform type. The version of the installation file includes a portion of the first packaged file. The version of the installation file is smaller than the first packaged file. The digital marketplace provides the version of the installation file to computing device.

Other implementations of this aspect include corresponding systems, apparatus, and computer programs, configured to perform the actions of the methods, encoded on computer storage devices.

The details of one or more implementations are set forth in the accompanying drawings and the description below. Other features will be apparent from the description and drawings, and from the claims.

BRIEF DESCRIPTION OF THE DRAWINGS

FIG. 2. is an example diagram of a manifest file.

Like reference symbols in the various drawings indicate like elements.

DETAILED DESCRIPTION

Figure 1:
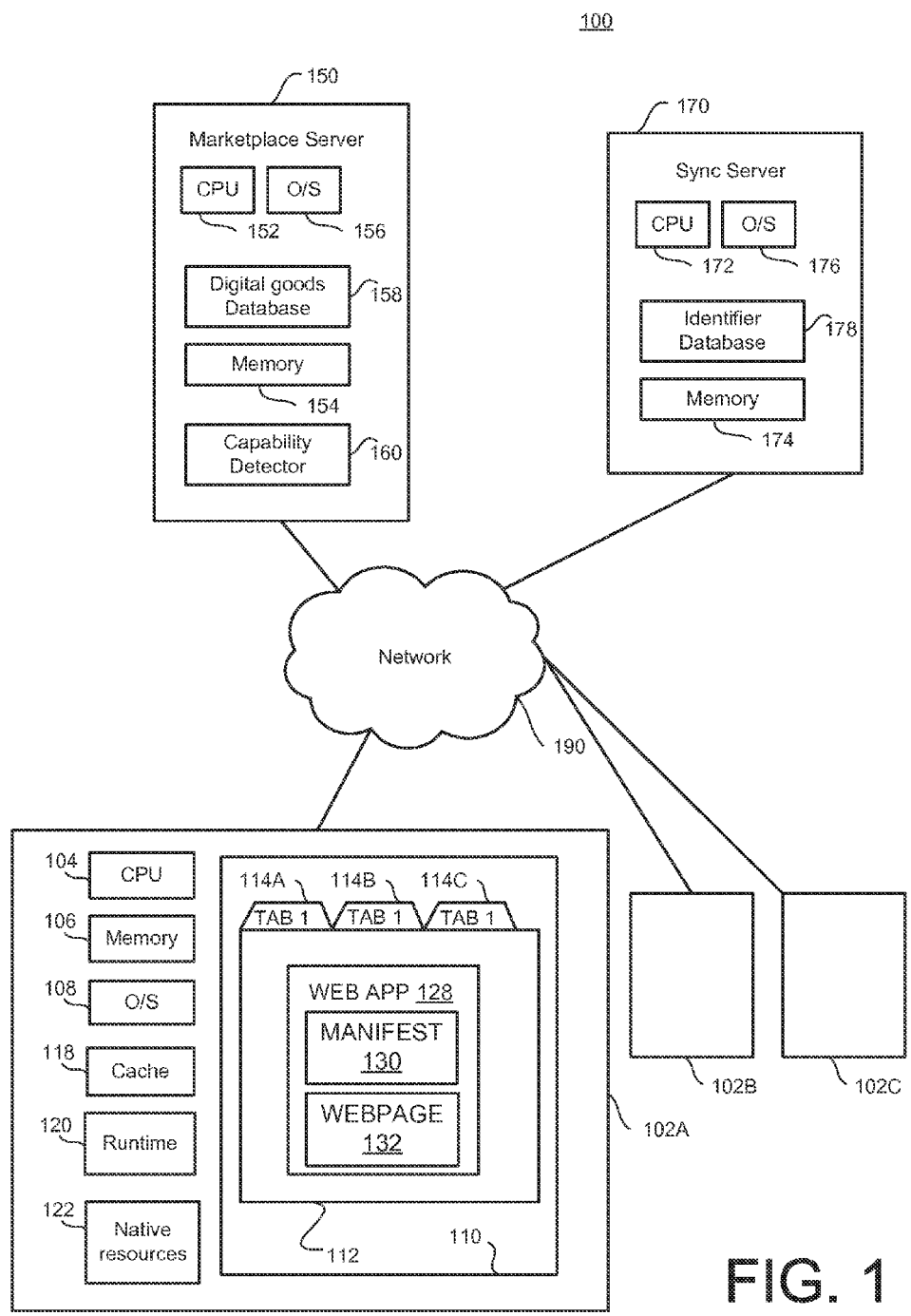
FIG. 1 is a schematic diagram of a system for installation of packaged web applications.

FIG. 1 is a schematic block diagram of an example embodiment of a system 100 that may provide installation of packaged web applications. In various implementations, the system 100 may include computing devices 102A, 102B, 102C (such as desktop computers, notebook computers, netbook computers, tablet computers, smart-phones, etc.). A computing device 102A can include one or more processors (CPU) 104 and one or more memories 106. The computing device 102A can execute an operating system (O/S) 108, a runtime 120, and various applications (such as an application 110 or a web application 128) which may display a user interface window (e.g., a web browser 112). The client computing device 102A can include a cache 118.

The web application 128 may be downloaded from a marketplace server 150 via a web browser, such as web browser 112, and may be installed on the computing device 102A. In this context, a "web application" may be configured to perform a single task or multiple tasks for a user. In such an implementation, the web application may be configured to be executed or interpreted by the web browser 112. Thus, web applications are run inside a browser with a dedicated user interface, and typically provide functionality and an experience that is more rich and interactive than a standalone website but are less cumbersome and monolithic than a native application. Examples of web applications include games, photo editors, and video players that are run inside the web browser 112. Web applications may provide more functionality such as, for example, both the technical ability to run while offline, as well as a user interface that actually helps users understand that the application is available offline. Moreover, web applications provide access to more powerful APIs than the regular web platform provides, such as direct access to the underlying operating system filesystem, communication with connected USB, serial, and BLUETOOTH devices, and raw TCP/UDP sockets.

Web applications can include at least a portion of a web site that itself includes web pages, plus some metadata that may be especially pertinent to the web application or to the user of the web application to allow the web application to perform some particular functionality for the user. As shown, the web application may be created using a manifest file 130 and at least one web page 132 (e.g., at least one HTML file, JAVASCRIPT or CSS file, etc.)

In one implementation, the client computing device 102A may be running or causing the operating system 108 to execute application 110 or web browser 112. In various implementations, this web browser 112 may include a plurality of panes or tabs 114A, 114B, 114C. The web browser 112 can include a visual area, usually rectangular, containing some kind of user interface. In a graphical user interface (GUI) used in the client device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." The tabs 114A, 114B, and 114C may execute in separate processes, each with its own individual memory.

The client computing devices 102A, 102B, 102C may receive online content from one or more server computing devices 150, 170, that may be connected to the client device 102 through a network 190. In some implementations, the received online content can be processed and displayed in the web browser 112 (e.g., in a on a tab 114 of the web browser 112). For example, the web browser 112 can display a user interface of a marketplace for digital goods, similar to the user interface of the marketplace described herein, to a user.

The client computing device 102A can communicate with a digital goods marketplace server 150 that provides a marketplace for digital goods to client computing devices 102A, 102B, 102C. The marketplace server 150 can include one or more processors 152 and one or more memories 154. The marketplace server 150 can execute an operating system 156 and various applications and services to provide functionality to the client computing devices. For example, in one implementation, the marketplace server 150 can include a digital goods database 158, and the digital goods can be served from, or downloaded from, the digital goods database 158 to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and the digital goods database 158 of the marketplace server 150 can provide just a reference to the individual repositories that are operated by the developers.

Information that is provided by the web application 128 running on a client device to the marketplace server 150 (e.g., regarding the type or capabilities of computing device 102A, etc.) can be provided on an opt-in basis. In other words, such information may be provided from the client computing device 102A to the server 150 only if the user of the client device specifically authorizes the transmission of such information from the client to the server. In addition, information may be anonymized before it is sent to the marketplace server 150.

The marketplace server 150 may include a capability detector 160. The capability detector 160 may detect features of the computing device (e.g., one of devices 102A, 102B, or 102C) that has requested to download the web application 128. The features may include, for example, hardware features, computing platform types, operating system types, modes, or other features of the computing device. The capability detector 160 may, for example, receive a request for a web application from the computing device 102A. The request may specify the web application as well as, for example, a computing platform type of the requesting device, i.e., the computing device 102A.

A computing platform may include a combination of hardware architecture, an operating system, an application layer, and a front end software framework. An example of a computing platform includes MACINTOSH, which includes custom APPLE hardware and a MAC operating system or x86 operating system. Another example includes CHROME, which may include any hardware or a CHROMEBOOK and CHROME operating system. Yet another example is WINTEL, including INTEL x86 or computer hardware with a WINDOWS operating system. Yet another example is ARM, using ARM architecture and any one of a number of mobile application software layers. Yet another example is LINUX, including any hardware running LINUX, and a LINUX operating system.

Examples of hardware features are graphics processing units (GPUs), processors (e.g., x86 verses ARM, 32 bit verses 64 bit), or whether a device has a touch screen. A hardware feature may also be an overall type of the device (e.g., a smartphone verses a desktop computer).

A developer may specify a type of hardware, such as a type of GPU required by a web application, for example by stating in the manifest file that a game application requires high end graphics processing. Alternatively or additionally, a developer may specify specific types of GPUs in the manifest file. As another example, a developer may specify in a manifest that an application is touch-screen enabled, or that a version of the web application only operates with a touch screen device.

In some implementations, the developer may specify that a certain capability is required for the web application, as compared to merely enabled for the web application. In such a case that the capability is required for the web application (e.g., graphics, touch, etc.), a version of the application may not be automatically synced to a second device associated with a user, if the second device does not have the required capabilities for the web application. For example, if a web application requires a touch screen, it may not be synced to a user's desktop computer that does not have a touchscreen.

As yet another example, the digital marketplace can detect that a client device is a smartphone and send smaller, lower resolution images to the device, to save space. If a user is on a desktop machine, the digital marketplace can send a version of the application that has larger, higher resolution images.

Developers may create different versions of a web application for a device using a MAC operating system verses a LINUX operating system. The digital marketplace may send the appropriate installation files to the device based on the type of operating system in use by the device.

Examples of modes of applications include a kiosk mode of operation. A kiosk mode feature may allow a web application to be the only application executing on a device at a time and may prevent a user from accessing an operating system or other application such as a web browser. The device may automatically update both the operating system and the application. A management console may allow an administrator to configure various kiosks from a remote location.

The kiosk mode may be executed in a consumer mode or an enterprise mode. In a consumer mode, a user may obtain an application from an online application store. The application may be developed using web technologies and may include a unique (e.g., 32-bit) identification number and a kiosk mode flag in a manifest file. The user may set the application identifier to be the kiosk application, via a user interface. In the background, the operating system may then download the application, restart the device 110, determining that it is set to execute in kiosk mode and determining that an application exists, and install the application. The device 110 may launch a special operating session that executes that application, for example without requiring any login or startup screen, so that the application operates immediately upon launching the device 110 as a full screen user interface with the startup screen of the application. In some implementations, the user may at any time disable the kiosk mode, to switch back to the basic mode, using a set of keyboard termination credentials.

When the client computer requests to download a packaged installation file, the client computer sends an install request that includes a type of operating system, processor, and other features of the computer device, with the permission of the user. The install request may be created by the runtime 120. The capability detector 160 may parse the install request to determine the features of the computer device that is requesting the packaged installation file.

The web application 128 may operate using the runtime 120, which is described in more detail below. The web application 128 may be packaged (e.g., in a .CRX format, or zipped, for example with some signature or verification) and provided to the computing device 102A, for example via web browser 112 from a digital marketplace such as marketplace server 150. The runtime 120 may accept the web application 128 as a packaged file (e.g., .CRX files) and then execute the web application 128.

Runtime 120 may be an environment that operates above the O/S 108 and that uses a multi-process architecture. Thus, if one application, tab, or web browser crashes, a user will not lose other applications that are simultaneously also running via runtime 120. Each application operates as a new process on the single runtime. The runtime 120 may also, in some implementations, be utilized to execute application 110 (including web browser 112).

The runtime 120 may also be downloaded from a marketplace server 150 (or another server) via a web browser, such as web browser 112, and may be installed on the computing device 102A. In some implementations, the runtime 120 may already be installed on the computing device 102A when the web application 128 is installed. In other implementations, runtime 120 may be bundled with a single download with the web application 128, and/or downloaded or installed prior to installation of the web application 128.

The web application 128 may, for example via runtime 120, access a network 190, and in some embodiments, the web application 128 may also access one or more native resources 122 of a client computer. Native resources 122 may include any kind of resource included in or locally connected to computing device 102A. For example, native resources 122 may include native windows (e.g., any windows outside a web browser tab), a graphics processing unit (GPU), a web camera, a graphics card, a microphone, a printer, a file system including documents, images, other media, or other resources, such as a device connected to computing device 102A.

As shown in FIG. 1, the system 100 can also include a sync server 170 that includes one or more processors to 172, one or more memories 174, an operating system 176, and an identifier database 178. The identifier database 178 can store unique identifiers to enable syncing between various user sessions on different client computing devices (e.g., one of devices 102A, 102B, 102C).

For example, in some implementations, a user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system (e.g., server 170) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser 112 or a certain device 102A, all of the user's bookmarks, extensions, web applications, natively operating applications, theme, and other browser preferences may be saved (e.g., in memory 174) and synced to a user's account (e.g., using identifier database 178). The user can then load these settings anytime the user signs into the web browser 112 on other computers and devices (e.g., devices 102B or 102C). Changes to browser settings, for example, may be synced instantaneously to the account, and may be automatically reflected on other computers where the user has signed in (and enabled syncing).

When a web application 128 has been installed, computing device 102A may locally store some data related to the application. A server (e.g., sync server 170) may ensure that local data from computing device 102A is synced across all of a user's devices or all devices that are used to log the user into a user account. Additionally, passwords traditionally are stored locally, but can be synced across devices using the server. Further, the server may sync across different devices all installed natively operating applications, web applications, browser extensions, browser bookmarks, settings, profiles, browser history, themes, plugins, local permissions, mode indicators, and data associated with the web applications and browser extensions for a user. For example, if a user of computing device 102A accesses a user account (for example, via a web browser) from computing device 102C, server 150 may copy settings and data associated with web applications and browser extensions (for example, that the user has selected to sync) from the user account to computing device 102C. Further, the server may be capable of device-sensitive sync. For example, certain versions of web applications with powerful graphics may be suitable for a desktop computer with a hardware accelerator and large display monitor, but not as suitable for a web-enabled phone, tablet, or laptop. The server may determine that a version of the web application is not as suitable for a user's web-enabled phone, tablet, or laptop, and may notify the user (e.g., during a sync or login process), or exclude a version or a web application from syncing on the user's web-enabled phone, tablet, or laptop.

Changes to settings on one computing device may be automatically copied (e.g., via server 170) from other computers (for example, if the user has enabled that sync feature). Synced data may be encrypted when it travels between computing devices 102A, 102B, 102C, and server 150 to keep information secure. Further, passwords may be encrypted on computing devices 102A, 102B, 102C, and server 150 using a cryptographic key.

The web application 128 may, in some implementations, be synced across all of a user's sessions, for example using sync server 170. For example, as mentioned above, a web application 128 may access an identity service using the runtime 120 (e.g., using an API), so that if a user is signed into a system, the web application 128 may access an identity of a logged-in user, for example via a unique identifier (if the application has the user's permission).

FIG. 2 is an example illustration of a manifest file. The manifest file 202 includes various fields for metadata describing the web application, such as the web application 128 described above with respect to FIG. 1. The manifest file may include, for example, a name field 210, a description field 212, a version field 214, and a requirements field 218. The name field 210 may include a name of the application, in this example, "Carz." The description field 212 may include a description of the application, such as shown in FIG. 2, for example "Enter a fast racing game." The description may be a plain text string that describes the application. The version field 214 may include a version number of the application, in this example, "1". The requirements field 216 may include requirements for the application, in this example, "Mac, "Windows," "Linux," "3D". The "3D" requirement may denote GPU hardware acceleration.

Figure 3:
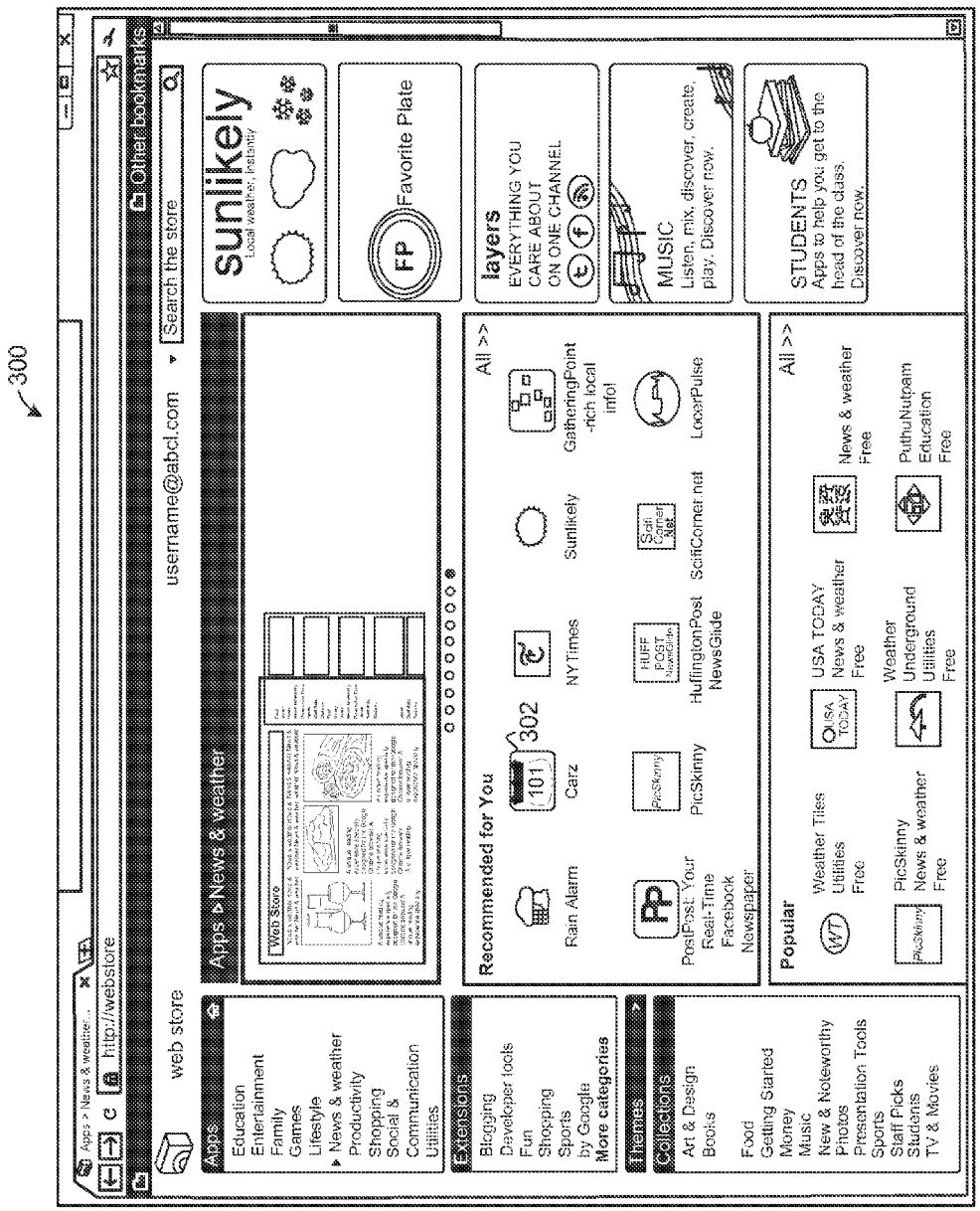
FIG. 3 is a diagram of an example of a user interface for a digital marketplace.

FIG. 3. is an example user interface of a digital marketplace. The user interface 300 may include a set of graphical user interface elements, such as element 302 for the web application "Carz." Upon a user selection of the element 302, which may represent a request to download and install the web application associated with the element 302, the digital marketplace may automatically determine the features of the client computing device requesting the web application "Carz." The digital marketplace (e.g., server 150 shown in FIG. 1) may create or access the appropriate version of the installation file associated with the web application "Carz," and send that installation file to the client computing device.

Figure 4:
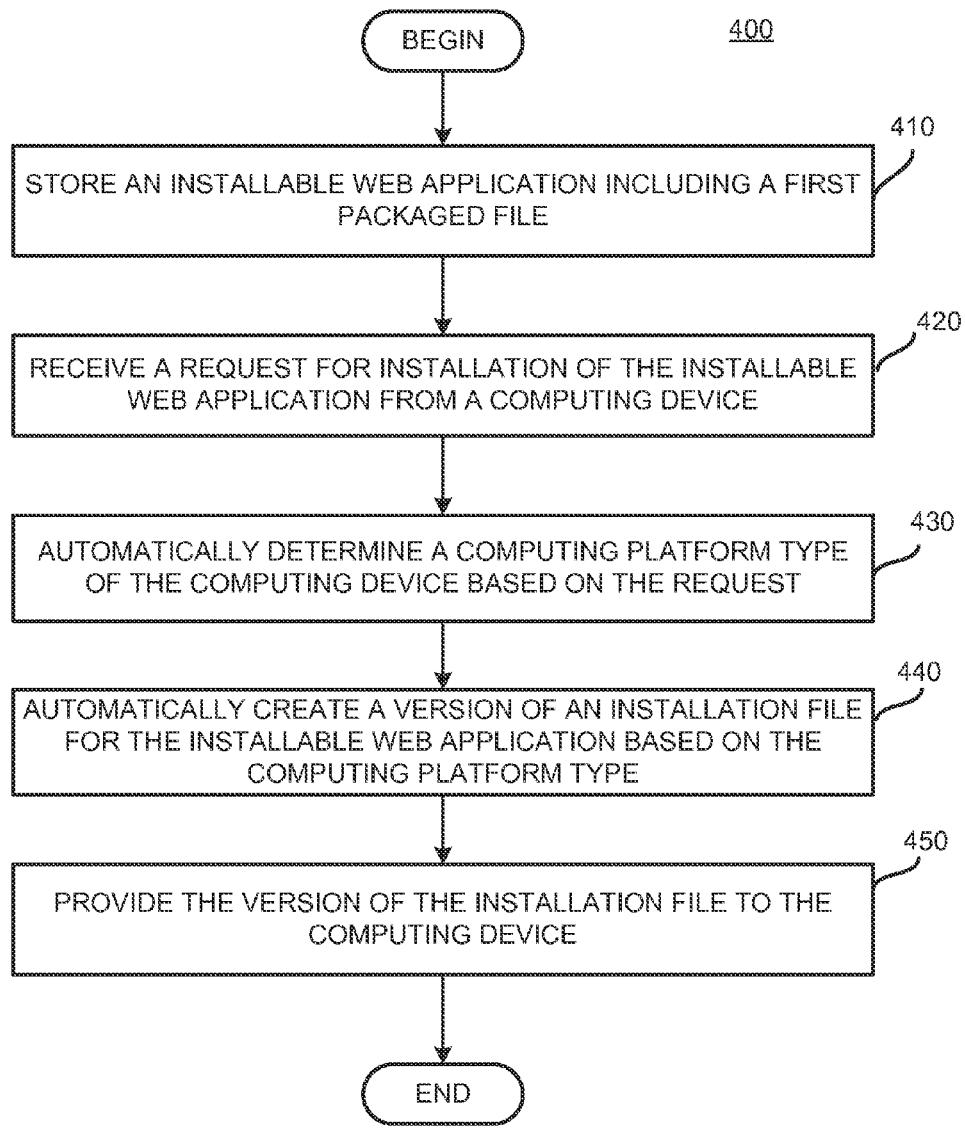
FIG. 4 is a flowchart of a process for installation of web applications.

FIG. 4 is a flowchart of a process for installation of packaged web applications. The flowchart shown in FIG. 4 may be performed at least in part by a server (e.g., the marketplace server 150 shown in FIG. 1). The server may store an installable web application including a first packaged file (410). The server may store the installable web application in a data store at the server or at a remotely accessible location. The first packaged file may include a manifest file and a web page. The packaged file may include various sub-directories with files that allow the web application to operate on different operating systems, for example.

The server may receive a request for installation of the installable web application from a computing device (420). For example, a user may view the digital marketplace as shown in FIG. 3 and may request installation of a web application by sending a request along with information about the device to the server.

The server may automatically determine a computing platform type of the computing device based on the request (430). For example, the server may parse the message request from the computing device to determine which type of computing platform the device is using (e.g., MAC, LINUX, WINDOWS, etc.).

The server may automatically create a version of an installation file for the installable web application based on the computing platform type (440). The version of the installation file may include a portion of the first packaged file. The version of the installation file may be smaller than the first packaged file. For example, if the computing platform type is MAC, the server may create a version of the installation file using a subdirectory of the packaged file that includes files for MACs.

The server may provide the version of the installation file to the computing device (450). For example, a user may only need to download a 10 MB file for his MAC instead of a 60 MB file that includes versions of the web application for the MAC, LINUX, WINDOWS, and CHROMEOS. Developers may therefore deliver one package to the web store, whereas from a user perspective, different client devices get different packages, which may be smaller.

The process shown in FIG. 4 is an example of one implementation, and may have steps deleted, reordered, or modified. For example, 440 may be performed before receiving any user requests. The entire process may be a one-click download from a user's perspective. As another example, the process 400 may also include determining that a computing device includes a specified feature (e.g., a GPU or a web camera), or mode.

Figure 5:
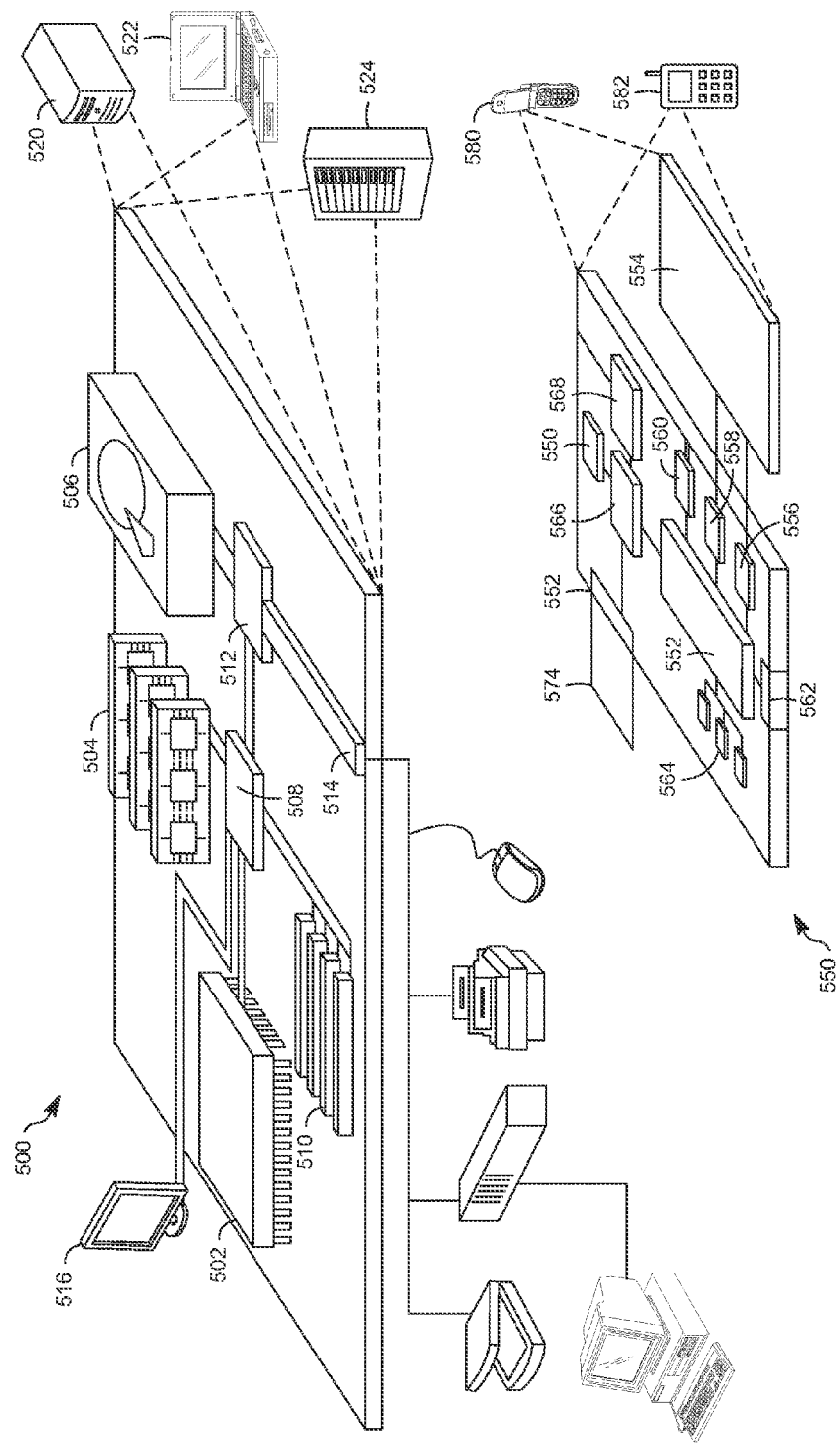
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 550. It may also be implemented as part of a smart phone 552, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    storing, at a digital marketplace, an installable web application including a first packaged file including a manifest file, a web page, and different executable portions, the different executable portions including:
        a first portion having instructions that are executable to implement the web application by a first computing platform type having a first processor type; and
        a second portion having instructions that are executable to implement the web application by a second computing platform type having a second processor type, the second processor type being different than the first processor type;
    receiving, at the digital marketplace, a request for installation of the installable web application from a computing device;
    automatically determining, by the digital marketplace, that the computing device is the first computing platform type, based on the request;
    automatically creating, from the first packaged file by the digital marketplace, a version of an installation file for installing the installable web application on the computing device based on the determination that the computing device is the first computing platform type, wherein the automatically creating the version of the installation file from the first packaged file includes:
        including the first portion of the first packaged file in the version of the installation file;
        excluding the second portion of the first packaged file from the version of the installation file, the version of the installation file being smaller than the first packaged file;

based on the manifest file of the first packaged file and by the digital marketplace, selecting at least one file corresponding with the first computing platform type for inclusion in the version of the installation file that is provided to the computing device, the at least one file corresponding with the first computing platform type being selected from a sub-directory of files included with the first packaged file; and providing, from the digital marketplace, the version of the installation file to the computing device.

2. The method of claim 1, wherein the automatically determining the computing platform type includes:
determining, by the digital marketplace, that a processor type of the computing device is the first processor type, based on the request.

3. The method of claim 2, further comprising:
determining the version of the installation file based on the determined processor type of the computing device.

4. The method of claim 1, wherein the version of the installation file includes a second packaged file including binary machine code compiled for execution by the first computing platform type.

5. The method of claim 4, wherein the installation file is a zip file.

6. The method of claim 1, wherein the first packaged file includes a set of files, each of the set of files being associated with a different computing platform type.

7. The method of claim 1, wherein the computing platform type includes a type of operating system of the computing device.

8. The method of claim 1, further comprising:
receiving, at the digital marketplace, the installable web application from a developer of the installable web application.

9. A computing device comprising:
a memory configured to store instructions;
a processor operably coupled to the memory and configured to execute the instructions to operate a runtime in a first execution process initiated by an operating system of the computing device; and
the runtime configured to:
send, to a digital marketplace, a request for installation of an installable web application from the computing device, the request including a message specifying a processor type of the computing device, the processor type of the computing device being a first processor type, and
download, from the digital marketplace, a version of an installation file for the installable web application based on the first processor type, the version of the installation file being automatically created from a single packaged file from the digital marketplace, the single packaged file including different executable portions, the different executable portions including a first portion having instructions for execution of the web application by the first processor type and a second portion having instructions for execution of the web application by a second processor type, the second processor type being different than the first processor type, the version of the installation file being customized based on the first processor type and based on a manifest file of the single packaged file,
the version of the installation file being smaller than the single packaged file, the version of the installation file being automatically created from the single packaged file by including the first portion of the single packaged file in the version of the installation file and excluding the second portion of the single packaged file from the version of the installation file,
wherein the digital marketplace, based on the manifest file of the single packaged file, creates the version of the installation file from a set of sub-directories of files included with the packaged file, the creating the version of the installation file including selecting at least one file corresponding with the first computing platform type from the set of sub-directories of files for inclusion in the version of the installation file.

10. The computing device of claim 9, wherein the single packaged file is a first packaged filed, and the version of the installation file is a second packaged file including binary machine code compiled for the first processor type.

11. The computing device of claim 9, wherein the version of the installation file is a zip file.

12. The computing device of claim 9, wherein the single packaged file is provided to the digital marketplace by a developer of the web application.

13. The computing device of claim 9, wherein the first processor type and the second processor type are two of a list of processor types specified in the manifest file.

14. A non-transitory computer readable medium containing instructions executable by a processor of a server to:
store an installable web application including a first packaged file including a manifest file, a web page, and different executable portions, the different executable portions including a first portion having instructions that are executable to implement the web application by a first computing platform type having a first processor type and a second portion having instructions that are executable to implement the web application by a second computing platform type having a second processor type, the second processor type being different than the first processor type;
receive a request for installation of the installable web application from a computing device;
automatically determine, based on the request, that the computing device is the first computing platform type;
automatically create, from the first packaged file, a version of an installation file for installing the installable web application on the computing device based on the automatically determining, wherein the automatically creating the version of the installation file includes:
including the first portion of the first packaged file in the version of the installation file;
excluding the second portion of the first packaged file from the version of the installation file, the version of the installation file being smaller than the first packaged file;
based on the manifest file of the first packaged file, selecting at least one file corresponding with the first computing platform type for inclusion in the version of the installation file that is provided to the computing device, the at least one file corresponding with the first computing platform type being selected from a sub-directory of files included with the first packaged file; and
provide the version of the installation file to the computing device.

15. The non-transitory computer readable medium of claim 14, wherein the installation file is a second packaged file that includes binary machine code compiled for execution by the first computing platform type.

16. The non-transitory computer readable medium of claim 14, wherein the installation file is a zip file.

17. The non-transitory computer readable medium of claim 14, wherein the automatically determining that the computing device is the is the first computing platform type is based on an indication of a type of operating system of the computing device.

* * * * *

UNITED STATES PATENT AND TRADEMARK OFFICE
CERTIFICATE OF CORRECTION

| | |
|---|---|
| PATENT NO. | : 10,025,574 B1 |
| APPLICATION NO. | : 14/019504 |
| DATED | : July 17, 2018 |
| INVENTOR(S) | : Sargent et al. |

Page 1 of 1

It is certified that error appears in the above-identified patent and that said Letters Patent is hereby corrected as shown below:

On the Title Page

Column 2, Item (74), in "Attorney, Agent or Firm", Line 1, delete "Bellerman" and insert -- Bellermann --, therefor.

In the Claims

In Column 15, Line 3, Claim 17, delete "is the is the" and insert -- is the --, therefor.

Signed and Sealed this
Second Day of October, 2018

Andrei Iancu
*Director of the United States Patent and Trademark Office*